(12) United States Patent
Dodds

(10) Patent No.: US 11,879,068 B2
(45) Date of Patent: *Jan. 23, 2024

(54) CORROSION INHIBITOR

(71) Applicant: Hexigone Inhibitors LTD, Swansea (GB)

(72) Inventor: Patrick Dodds, Carmarthenshire (GB)

(73) Assignee: Hexigone Inhibitors Limited, Swansea (GB)

( * ) Notice: Subject to any disclaimer, the term of this patent is extended or adjusted under 35 U.S.C. 154(b) by 18 days.

This patent is subject to a terminal disclaimer.

(21) Appl. No.: 17/699,646

(22) Filed: Mar. 21, 2022

(65) Prior Publication Data

US 2022/0213331 A1    Jul. 7, 2022

Related U.S. Application Data

(63) Continuation of application No. 16/608,184, filed as application No. PCT/GB2018/051083 on Apr. 25, 2018, now abandoned.

(30) Foreign Application Priority Data

Apr. 25, 2017    (GB) .................................... 1706574

(51) Int. Cl.
| | |
|---|---|
| C09D 5/08 | (2006.01) |
| C08F 212/14 | (2006.01) |
| C09D 129/14 | (2006.01) |
| C09D 133/00 | (2006.01) |
| C09D 175/04 | (2006.01) |

(52) U.S. Cl.
CPC ............ C09D 5/086 (2013.01); C08F 212/30 (2020.02); C09D 5/084 (2013.01); C09D 129/14 (2013.01); C09D 133/00 (2013.01); C09D 175/04 (2013.01)

(58) Field of Classification Search
None
See application file for complete search history.

(56) References Cited

U.S. PATENT DOCUMENTS

| | | | |
|---|---|---|---|
| 3,899,624 A | 8/1975 | Sutherland | |
| 4,643,769 A | 2/1987 | Othen | |
| 4,795,492 A * | 1/1989 | Othen | ................ C09D 5/106 |
| | | | 252/387 |
| 2006/0049167 A1 | 3/2006 | Yang et al. | |
| 2012/0085261 A1 | 4/2012 | Barbe et al. | |
| 2012/0270129 A1 | 10/2012 | Marinho et al. | |
| 2018/0312981 A1 | 11/2018 | Dodds et al. | |

FOREIGN PATENT DOCUMENTS

| | | |
|---|---|---|
| CN | 105349000 A | 2/2016 |
| EP | 0170356 A1 | 2/1986 |
| JP | H03215574 A | 9/1991 |
| JP | H11279452 A | 10/1999 |
| JP | 2007217732 A | 8/2007 |
| JP | 2008546910 A | 12/2008 |
| JP | 112050744 A2 | 9/2011 |
| WO | 2007002558 A1 | 1/2007 |
| WO | 2017064499 A1 | 4/2017 |

OTHER PUBLICATIONS

European Patent Office, International Search Report and Written Opinion issued in corresponding international application No. PCT/GB2018/051083, dated Jul. 6, 2018, 11 pp.
Database WPI, Week 201630, Thompson Scientific, London, GB, AN 2016-135815, XP002781577, Copyright 2017, 2 pp.

* cited by examiner

Primary Examiner — Tanisha Diggs
(74) Attorney, Agent, or Firm — DINSMORE & SHOHL LLP

(57) ABSTRACT

The present invention relates to a corrosion inhibitor and a corrosion inhibiting coating provided for coating a metal, particularly but not exclusively steel. The inhibitors pigment will also protect aluminium and magnesium alloys. The corrosion inhibitor particularly protects a sacrificial coating such as zinc or zinc alloy on galvanised steel, which in turn therefore provides improved corrosion resistance to the underlying steel. The present invention comprises an organic cation in a cation exchange resin.

9 Claims, 4 Drawing Sheets

CORROSION INHIBITOR

CROSS-REFERENCE TO RELATED APPLICATIONS

This application is a continuation of U.S. application Ser. No. 16/608,184 filed Oct. 25, 2019, which is the U.S. National Stage of PCT/GB2018/051083 filed Apr. 25, 2018, which claims priority to United Kingdom application number 1706574.9 filed Apr. 25, 2017, the disclosures of each of which are hereby incorporated by reference in their entirety.

FIELD OF THE INVENTION

The present invention relates to a corrosion inhibitor and a corrosion inhibiting coating provided for coating a metal, particularly but not exclusively steel. The inhibitors pigment will also protect aluminium and magnesium alloys. The corrosion inhibitor particularly protects a sacrificial coating such as zinc or zinc alloy on galvanised steel, which in turn therefore provides improved corrosion resistance to the underlying steel.

BACKGROUND OF THE INVENTION

Corrosion inhibitors sometimes referred to as corrosion inhibitive pigments in the form of sparingly soluble inorganic salt powders, dispersed within an organic coating have been traditionally used to protect a wide range of metallic surfaces, including steel and galvanised steel. A typical steel coating system is shown in FIG. 1 and comprises a steel substrate 2, a metallic coating 4 (to sacrificially protect the steel substrate, typically comprising zinc or a zinc alloy), a conversion coating 6 (to provide improved adhesion between the metallic coating and organic coating, as well as to provide corrosion inhibition), a primer 8 and a barrier 10 (typically comprising a polymeric coating). The primer typically comprises a polymer and solvent mixed with a corrosion inhibitor such as zinc or strontium chromate. In the event of rupture of the barrier materials as shown in FIG. 2, inhibitive species derived from the zinc or strontium chromate leach out of the primer 2 and form a precipitate or protective layer around the point of rupture, thus protecting the underlying steel substrate 2. This is represented in FIG. 2.

Current anti-corrosion inhibitors comprise sparingly soluble chromium salts such as zinc or strontium chromate, which have a degree of toxicity which is not environmentally acceptable. Although alternative, environmentally acceptable (Cr (vi)-free) inhibitive pigments, typically based on sparingly soluble phosphate slat technologies are available, they are invariably less effective than their chromate counterparts. In addition, inhibitive species are progressively leached out over time, leading to a loss of coating barrier protection, whereas it would be more desirable to store the corrosion inhibitive species within the coating until such point as they are required (i.e. so-called "on-demand" release).

JP 112050744 describes the use of benzotriazole (BTA) which is incorporated in a film that is laid over a copper surface. Copper or copper alloy materials have a natural coating of a thin copper oxide on their surface and the BTA molecule forms a covalent bond with the copper oxide to form a strong BTA polymer film on the surface of the copper or copper alloy material. The film is a discrete coating layer that prevents the ingress of water and air onto the surface of the metal. However, if that coating is breached then the film does not act by any kind of chemical reaction to prevent corrosion occurring, but instead the remaining film acts to retain moisture on the underlying metal surface accelerating corrosion.

The present invention seeks to overcome the problems of the prior art by providing a corrosion inhibitor, additive and a coating including a corrosion inhibitor that can be released from a coating as and when it is needed (i.e. a 'smart' or "on-demand" inhibitor), and is also more effective and environmentally acceptable than known inhibitors and inhibitor bearing coatings or primers.

Submit CorrectionsClose

SUMMARY OF THE INVENTION

According to an aspect of the present invention there is a corrosion inhibitor comprising an organic cation in a cation exchange resin.

The corrosion inhibitor preferably comprises or may be termed a corrosion inhibiting pigment.

Also according to the present invention there is provided a coating for a metal substrate comprising a corrosion inhibitor provided in a polymer binder, the corrosion inhibitor comprising an organic cation in a cation exchange resin.

The corrosion inhibitor may be combined with a polymer binder to form a coating for application to a substrate.

The coating may be applied to a metal substrate as part of a coating system, such that other materials or additives may be provided in the coating, and/or additional coating layers may be applied to the substrate. The coating may be termed a primer.

Organic cations are any cations that fit the general definition of an organic compound, which comprise at least carbon and hydrogen atoms. An organic cation in a cation exchange resin provides a corrosion inhibitor having the beneficial properties of acting as a smart release corrosion inhibitor with improved capability for providing corrosion resistance whilst also being environmentally acceptable. Such a corrosion inhibitor is capable of allowing dissociation of the organic cation from the cation exchange resin under the conditions of a corrosive electrolyte becoming present, and sequesters ions (preferably benzotriazole) in a protonated form to form a precipitate or barrier layer by deprotonation to prevent further corrosion.

The finding of the beneficial corrosion inhibition properties of a corrosion inhibitor comprising an organic cation in a cation exchange resin is contrary to expected and known teachings. In a corrosion environment the ions released are generally metal cations due to the loss of electrons in the corrosion process. Accordingly, in order to address the presence of metal cations and form an insoluble precipitate the expected and taught solution is to provide anions which would readily combine with the metal cations or surface. However, the present invention teaches instead to release cations which would ordinarily repel the metal cations and thus have no desirable effect upon the metal cations and not result in the formation of an insoluble precipitate to prevent further corrosion.

It has been found however that as the organic cation is released it is deprotonated by the corrosive environment to become neutral, and if the environment is alkaline may be deprotonated again into an anionic form and react with the metal cation to form the desired insoluble precipitate. The use of an organic cation in a cation exchange resin such as Amberlite®, allows the manufacturing process to have no solution waste stream, as the cationic exchange resin does not have a chloride counterion. By using a cationic resin, the corrosion inhibitor also enables an enhanced cure for a coating into which the inhibitor is added.

A further benefit associated with a corrosion inhibitor comprising an organic cation in a cation exchange resin is the effect of improving the cure of a coating on a metal substrate. The curing process has been found to be enhanced, leading to improved physical properties as a result of the enhanced cure.

In the protection of galvanised steel, the organic cation dissociates to provide protection to be zinc or zinc oxide sacrificial layer. This improves the lifespan of the sacrificial layer.

An aspect of the present invention preferably extends to an additive for addition to a coating for imparting corrosion resistance upon a substrate comprising a first corrosion inhibitor comprising an organic cation in a cation exchange resin and a second corrosion inhibitor comprising inorganic cation modified silica.

The organic cation modified silica is preferably calcium cation modified silica.

It has been determined that by providing this first and second corrosion inhibitor as a mixture the protective performance of a coating in which the mixture is present means the insoluble precipitate formed is increased. A synergistic effect between the organic cation in a cation exchange resin and an inorganic cation modified silica is achieved.

The first and preferably second corrosion inhibitor are beneficially particulate. This enables dispersion within a coating to provide corrosion protection to a substrate. The organic cation in a cation exchange resin and the inorganic cation modified silica are preferably each provided in particulate form and provided as a mixture. The mixture preferably comprises a range of usable ratios having a weight percent between 1:10 organic cation in a cation exchange resin:inorganic cation modified silica and 10:1 respectively.

The organic cation is preferably an azole, oxime or hydrophobic amino acid where an azole is characterised as any of numerous compounds characterised by a five membered ring containing at least one nitrogen atom. The organic cation is preferably benzotriazole or derivatives thereof, such as 5 methyl benzotriazole and others. Benzotriazole is a solid provided as a powder at room temperature and pressure, and protonation of benzotriazole provides positively charged benzotriazole which is then attracted to the cation exchange resin to provide a corrosion inhibitor. An organic cation comprising a benzene ring, particularly benzotriazole has been found to be beneficial. When the electrolyte is present (comprising cations and anions) cations are sequestered by the cation exchange resin which releases protonated benzotriazole into the electrolyte where it is deprotonated (this will moderate the under film pH) and will eventually turn into its anionic form at pH's above 7.2. Another beneficial effect is when the benzotriazole is in a neutral form a barrier layer can form on the metallic surface. The azole group at one end forms a bond with the metallic surface and also metallic ions released the anodic dissolution. The adsorbed benzotriazole is thought to stifle electron transfer reactions while the precipitate formed by reaction of benzotriazole anions with metal cations forms an inhibitive film which blocks the surface to further corrosive attack.

The cation exchange resin, sometimes referred to as a cation exchange polymer, is an insoluble matrix preferably formed of a plurality of particles, often referred to as beads. These beads may have a diameter of 0.5-1 mm diameter. The ion exchange resin provides ion exchange sites.

The cation exchange resin is preferably an organic cation exchange resin. It is envisaged that the organic cation exchange resin may be styrene/divinylbenzene copolymer with a negatively charged group, such as a sulphonated group. It has been found beneficial that the organic cation exchange resin is an organic cation exchange resin which attracts the organic cation to provide the corrosion inhibitor.

It is preferred that the divinylbenzene is a styrene divinylbenzene copolymer having a sulphonated functional group.

Preferably for application to a substrate the additive comprising the one or more corrosion inhibitor is contained in a polymer binder. The polymer binder acts to carry the corrosion inhibitor(s), and bind it within the polymer. The polymer is beneficially liquid at room temperature and pressure. The corrosion inhibitor(s) are beneficially solid at room temperature and pressure, and are dispersed through the polymer binder. The polymer binder may be selected from one or more of an acrylic, polyurethane or polyvinyl butyral.

The solid, preferably particulate corrosion inhibitor(s) incorporated into the polymer binder, forms an organic paint, coating or primer. This paint or coating can then be used to coat a substrate, such as a metal object e.g. a sheet.

The particulate size of the corrosion inhibitor(s) is preferably less than 100 microns, even more preferably less than 50 microns, preferably less than 20 microns, and preferably less than 5 microns depending on the coating application. The particulate corrosion inhibitor is preferably dispersed through a polymer binder.

It is envisaged that the ratio of organic cation to cation exchange resin matrix is approximately 10% by wt of organic ion to ion exchange resin matrix. An example of a suitable composition is 100 ml of 0.1-0.4M benzotriazole in deionised water per 10 g of inhibitor.

A coating according to the present invention may comprise an organic cation in a cation exchange resin matrix and further comprise a second corrosion inhibitor comprising an inorganic cation in a cation exchange resin which may work in synergistic action. This may be incorporated in order to provide a store for inhibiting cations. The benefit of this is to prevent corrosion induced coating failure at points where the coating is breached. This second corrosion inhibitor is capable of blocking cathodic disbondment or filiform corrosion.

A suitable inorganic cation may be a cation that forms highly insoluble precipitates with hydroxide anions, examples of which are cobalt, calcium, cerium, zinc and magnesium.

The cation exchange resin may for example be a divinyl benzene matrix with a sulphonated functional group. A sulphonated group is beneficial as maintains a negative charge holding the cation in place.

According to another aspect of the present invention may also be defined as an additive or pigment for addition to a coating for imparting corrosion resistance upon a substrate comprising a first corrosion inhibitor comprising an organic cation in a cation exchange resin and a second corrosion inhibitor comprising an inorganic cation in a cation exchange resin.

The first and second corrosion inhibitors may be in a mixed, preferably particulate form. They may be added either together or separately to a polymer binder to produce a coating. The particulate size of the second corrosion inhibitor may be the same or similar to that of the first corrosion inhibitor.

Also according to the present invention there is a method of manufacturing a corrosion inhibitor comprising the step of combining organic cations with a cation exchange resin.

The organic cations may be provided in solution and the method may further comprise the step of combining the cation exchange resin with the solution. The cation exchange resin is beneficially in a solid form. A plurality of modified solid beads are formed as a result of ion exchange. The combination of organic ions and cation exchange resin matrix are preferably mixed.

The method preferably further comprises filtering the ion exchange resin beads from the solution. The method preferably comprises the step of drying the beads. The beads are preferably heat treated.

The method preferably further comprises breaking up the beads into smaller particles, which may be achieved through a variety of mechanical methods such as milling. A powder is beneficially produced by the mechanical breaking up of the beads.

The organic cations can be produced by different techniques. The organic cations may be produced by dissolving an organic compound into solution, the organic compound being capable of disassociating into at least two ions, one of the ions being the organic cation, wherein the solution has a pH of less than 3. A pH of less than 3 is preferred. Decreasing the pH of the solution may be achieved by adding an acidic material such as phosphoric acid to the solution.

In an alternative step an organic compound is provided in solution and is combined with a cation exchange resin having a negatively charged functional group for dissociating the organic compound to organic cations and anions, wherein the organic cations and cation exchange resin together form the corrosion inhibitor. The solution may be a water or water solvent mix. The method preferably further comprises heating the solution. The organic cation formed as a result of dissolving the organic compound enters the cation exchange resin due to the appearance of the negatively charged functional group which may, for example, be a sulphonic acid functional group. This therefore provides a sulphonated functional group.

The organic cations are preferably an azole and preferably comprise benzotriazole. The ion exchange resin matrix is preferably an organic cation exchange resin matrix, preferably divinylbenzene/styrene copolymer.

The method may further comprise the steps of combining a second corrosion inhibitor formed by combining an inorganic cation with a cation exchange resin to the coating.

The method may comprise the step of mixing particulate first corrosion inhibitor comprising an organic cation in a cation exchange resin with particulate inorganic cation modified silica to provide an additive for a coating.

BRIEF DESCRIPTION OF THE DRAWINGS

An embodiment of the invention will now be described by way of example only with reference to and as illustrated in the following figures and examples in which.

DETAILED DESCRIPTION OF THE INVENTION

Figure 1:
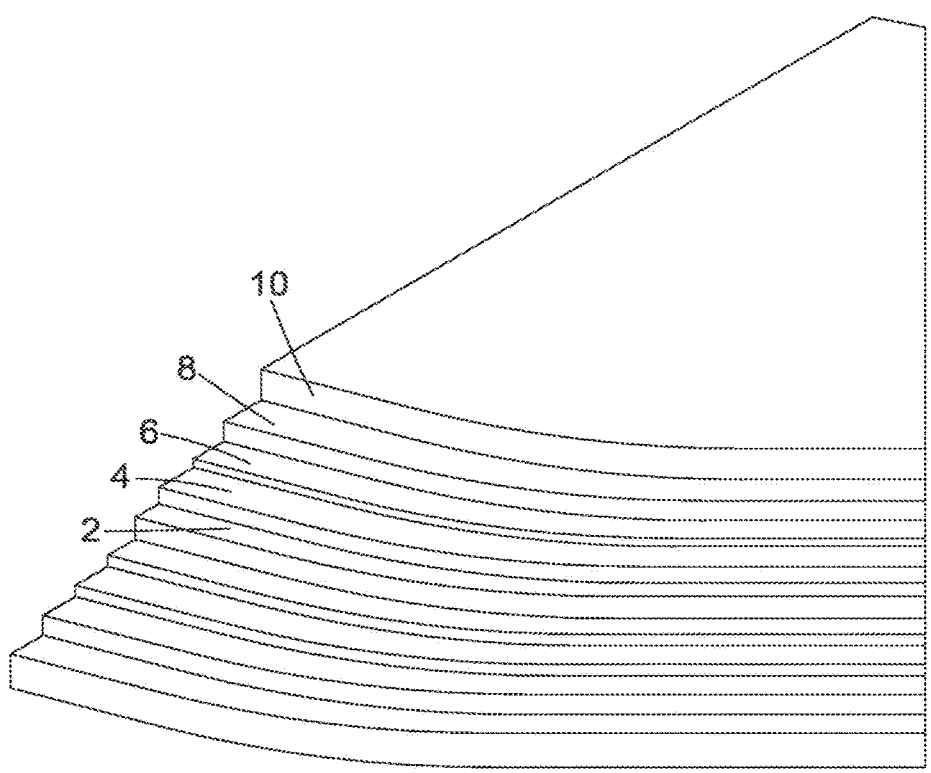
FIG. 1 shows: a schematic exploded view of a typical metal substrate and coating layers.
Figure 2:
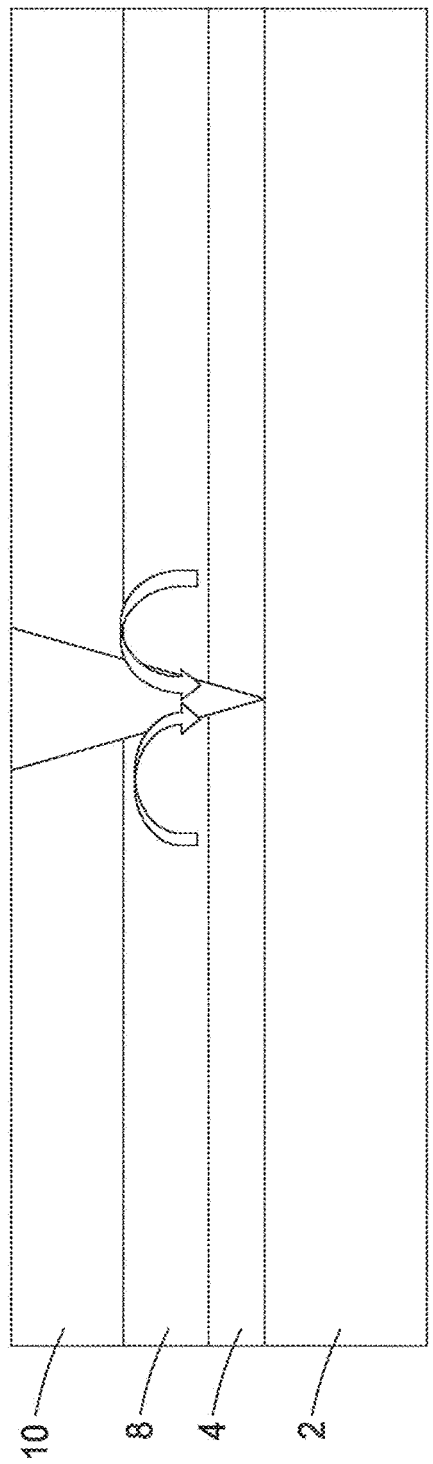
FIG. 2 shows: the action of a corrosion inhibitor in the event of a breach of coating layers to reach the metal substrate.

The present invention has been developed to provide a smart-release corrosion inhibitor which has particular but not exclusive application in the protection of galvanised steel from corrosion. The inhibitor, which is usually applied as a primer to a metal surface in liquid form at room temperature and pressure contains an organic ion, preferably an azole, and even more preferably benzotriazolate (BTA). This is added to an ion exchange matrix. The ion exchange resin matrix in one embodiment is a divinylbenzene copolymer with a sulphonate functional group as shown below. The benzene ring with the three nitrogen atoms is benzatriazolate and is positively charged due to extra hydrogen cation. The ion exchange resin matrix is the remainder and is shown as being negatively charged.

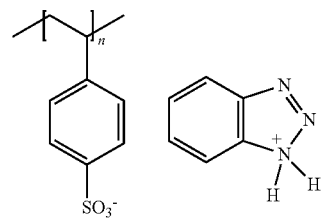

The corrosion inhibitor structure is formed of repeating units of the ion exchange resin with a sulphonated group having a negative charge to hold the corrosion inhibiting cation of protonated benzotriazole in place until positively charged corrosion electrolyte ions are present.

To make the corrosion inhibitor according to an exemplary embodiment, benzotriazole is dissolved in water at a molar concentration of 0.25M. The solution can be heated to dissolve the benzotriazole or the pH is adjusted using an acid. A suitable amount through experimentation of benzatriazole is 29.78 g per litre of water. An amount of the solution is taken which may be at room temperature, or it can also be heated, for example to 40 degrees Celsius and divinylbenzene copolymer with a sulphonated functional group is added to the solution. As an example 10 g of the divinylbenzene copolymer is added to 100 ml of the solution containing the benzotriazole. The mixture is stirred, typically for an hour and left to settle so that beads are formed. Once the beads have settled the supernatant solution is decanted off and replaced with more 0.25M benzotriazole solution in the ratio of 100 ml to 10 g of original weight of exchanger. This encourages more ion exchange. The topped up solution is stirred for another period, typically an hour and any supernatant left after a further period of settling is decanted and replaced with further solution. The topped up solution is stirred further, for example for a further four hours to ensure saturation of BTA within the matrix. The resultant beads are filtered off and washed with de-ionised water. This process ensures the exchange of the Cl anion of the divinylbenzene copolymer with the BTA is maximised.

Another processing route for the inhibitor, is to run a benzotriazole solution through an ion exchange column process. The resin beads are static in the column and a solution of corrosion inhibitor is run through the column, where the beads pick up the corrosion inhibitors from the solution. The beads can be removed from the column and processed using the methods below.

The beads contain a BTA in a divinyl benzene matrix. The beads are then dried for a period of time such as overnight at 40 degrees Celsius and then ball milled (typically for 1 hour) to achieve a powdered form that can be added to a coating such as a primer coating. The powdered material that is formed may be added to a primer at a range of 1-30% w/w.

An inorganic cation in a cation exchange resin to provide an optional second corrosion inhibitor within the polymer binder is beneficial which may act synergistically. The second corrosion inhibitor may be achieved by the following exemplary procedure. Cation exchange resin beads (e.g. Amberlite™ or Dowex™) were dispersed in 1 mol $dm^{-3}$ aqueous solutions of the relevant metal chloride salt and the resulting suspensions stirred for 2 hours. The suspensions were subsequently left to settle overnight and the supernatant decanted. The resin beads were exhaustively washed by repeated cycles of centrifugation and re-dispersion in fresh distilled water, until no chloride ions could be detected in the supernatant by silver nitrate aqueous solution testing. The inorganic cation solution can be used in ion exchange columns to add the cations to the cation exchange resin.

Finally the resin beads were dried in air at 40° C. and ground in a planetary mill to give a particle size of <5 microns diameter, or milled in a jet mill to give a d50 of 5 μm. The second corrosion inhibitor may then be incorporated with the polymer binder and first corrosion inhibitor.

The corrosion inhibitor may be mixed with an inorganic cation modified silica, preferably calcium cation modified silica (an example of which is sold under the tradename Shieldex®). The particulate organic cation in the cation exchange resin is preferably mixed with particulate inorganic cation modified silica, however it will be appreciated that mixing may occur before breaking down into particulate form.

The primer may be used in a multi-layer system on coated Hot Dip Galvanised (HDG) Steel, to protect from under-film corrosion. The benzotriazolate is released when it comes into contact with a corrosive electrolyte after which it sequesters the electrolyte ions. Typically the primer is used on a zinc or zinc alloy surface and forms a protective layer by adhering onto the zinc surface. If there is any corrosion, the organic exchange matrix will sequester ions that have been formed as a result of the corrosion and by having the active agent in a matrix, there is also slow release of benzotriazole.

A series of coatings was prepared by dispersing various volume fractions of the corrosion inhibitor formed of benzatriazole in an ion exchange resin matrix, which is then mixed in a polyvinyl butyral binder. This mixture was then applied to HDG steel and an in situ scanning Kelvin probe was used to evaluate the efficiency of the mixtures in inhibiting corrosion driven coating failures by cathodic delamination. The $Na^+$ and other cations present are sequestered into the coating and benzotriazole released and deprotonated due to the local pH as it is released into the defect electrolyte. The deprotonated benzotriazole can now remain in a neutral form, or if the pH of the environment is above approximately pH6 then the neutral deprotonated benzotraizole can be deprotonated again to form a benzotrialozate anion which can react to form a precipitate with $Zn^{2+}$ (Zn(BTA)2). An insoluble precipitate is thus formed blocking interfacial electron transport. Another effect is that benzotriazole is hydrophobic in nature and binds to the metal surface in a mono layer, which then attracts other benzotriazole molecules, creating a barrier to the electrolyte and oxygen.

Under normal corrosion conditions as described above, the organic cation (benzotrialozate) exchanges off the cation exchange resin to either react with a metal cation to form a complex and reacts with free ions of the corrosion process at the surface of the metal. The effect of the inorganic cation modified silica is to provide a third possibility where reaction occurs with the inorganic cation modified silica (calcium) to form insoluble precipitates. The precipitate formed by this third route is highly insoluble and provides a strong barrier to further corrosion.

Figure 3:
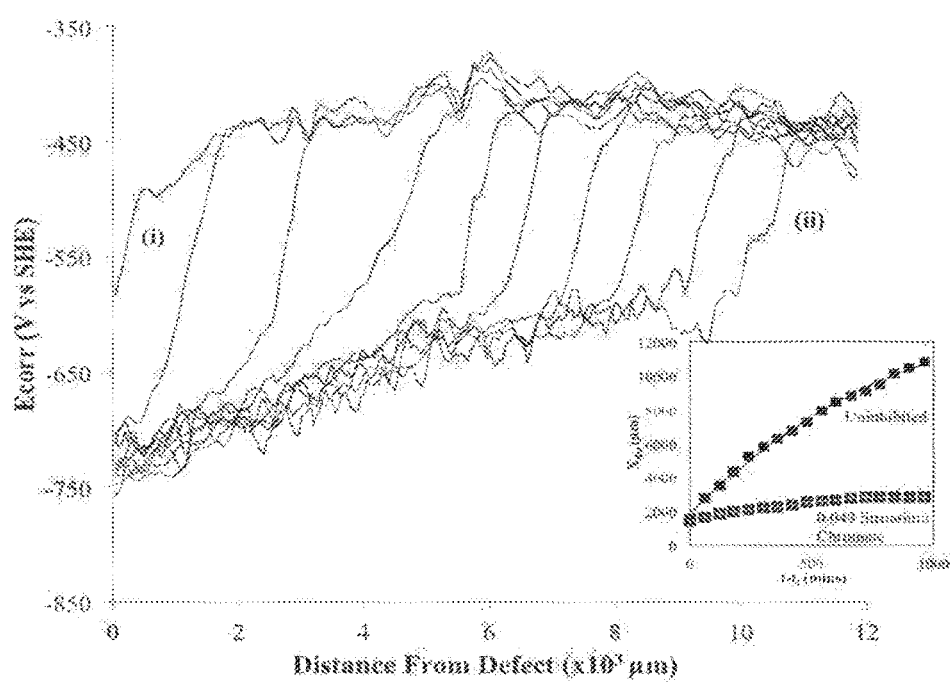
FIG. 3 shows: the corrosion progress of a coated metallic substrate without an inhibitor included in the coating (i) is 240 minutes after initiation, then every line 60 mins up to (ii) 780 mins. Inset is the distance from defect vs time for an uninhibited system and a strontium chromate inhibited system.

FIG. 3 shows the corrosion progress of a coated metallic substrate without an inhibitor included in the coating (i) is 240 minutes after initiation, then every line 60 mins up to (ii) 780 mins. This shows the progress of corrosion over time as the corrosion progresses under the coating, and shows that after 780 minutes there is 12 mm of corrosion for an unprotected coating. The upper lines represent the intact measures potential of the coating and the lower line represents the delaminated potential of the coating, with the joining lines representative of the corrosion front at 60 minute intervals. Inset is the distance from defect versus time for an uninhibited system and a strontium chromate inhibited system, showing the relative effectiveness of use of traditional strontium chromate as corrosion inhibitor.

Figure 4:
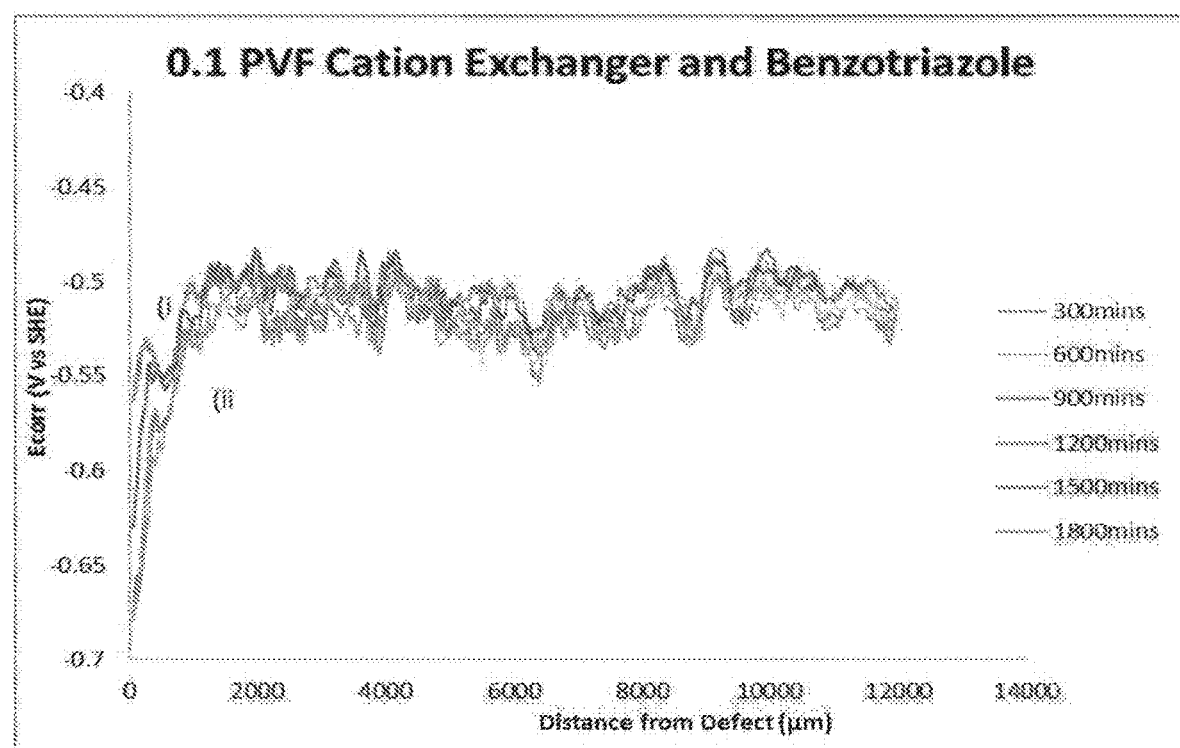
FIG. 4 shows: the delamination of a coating on a hot-dip galvanised steel (HDG) surface with a loading of 0.1 PVF of benzotriazole in a cation exchange resin.

FIG. 4 shows the delamination of a coating on a hot-dip galvanised steel (HDG) surface with a loading of 0.1 PVF of benzotriazole in a cation exchange resin. This representation can be compared directly to the graph of FIG. 4 where at a defect site there is initial progression of a defect to a distance of 1 mm, following which there is no subsequent progression of that defect. Thus, the presence of a corrosion inhibitor according to an exemplary embodiment of the present invention halts subsequent defect progression by providing a highly corrosion inhibitive system. This is further shown through the presence of multiple overlaid plots up to 1800 minutes showing no additional defect progression.

The present invention has been described by way of example only and it will be appreciated by the skilled addressee that modifications and variations may be made without departing form the scope of protection afforded by the appended claims.

The invention claimed is:

1. A coating for a metal substrate comprising:
   a polymer binder; and
   a corrosion inhibitor, the corrosion inhibitor being a particulate comprising:
   benzotriazolate or a derivative thereof ionically bonded to active sites of a cation exchange resin;
   wherein a particulate size of the corrosion inhibitor is less than 100 microns.

2. A corrosion inhibitor as recited in claim 1, wherein the cation exchange resin is an organic cation exchange resin matrix.

3. A corrosion inhibitor as recited in claim 2, wherein the cation exchange resin is a styrene and/or divinylbenzene copolymer with a negatively charged group.

4. A corrosion inhibitor as recited in claim 3, wherein the styrene and divinylbenzene copolymer has a negatively charged sulphonated functional group.

5. A corrosion inhibitor as recited in claim 1, wherein the particulate size of the corrosion inhibitor is less than 50 microns, less than 20 microns or less than 5 microns.

6. A corrosion inhibitor as recited in claim 1, wherein a ratio of organic cation to cation exchange resin is approximately 100 ml to 10 g of weight of cation exchange resin.

7. A coating according to claim 1, wherein the polymer binder is selected from one or more of an acrylic, polyurethane or polyvinyl butyral.

8. A coating as recited in claim 1, in a form of a paint.

9. An additive for addition to a coating for imparting corrosion resistance upon a substrate, the additive comprising:
   first corrosion inhibitor particulates comprising:
   benzotriazolate or a derivative thereof ionically bonded to active sites of a cation exchange resin;
   wherein the first corrosion inhibitor particulates have a particle size less than 100 microns; and
   a second corrosion inhibitor comprising an inorganic cation in a cation exchange resin.

\* \* \* \* \*